Patented Oct. 24, 1944

2,361,355

UNITED STATES PATENT OFFICE 2,361,355

ALKYLATION PROCESS

Alexander N. Sachanen, Woodbury, N. J., and Selby B. Davis, Cambridge, Mass., assignors to Socony-Vacuum Oil Company, Incorporated, New York, N. Y., a corporation of New York No Drawing. Application May 20, 1941, Serial No. 394,295

12 Claims. (Cl. 260—671)

This invention relates to the alkylation of aromatic hydrocarbons and other aromatic compounds. The invention is concerned particularly with the production of alkyl aromatic hydrocarbons of gasoline boiling range.

The alkylation of aromatic hydrocarbons and other aromatic compounds with olefins etc. in the presence of various catalysts is well-known. In the past, catalysts have been used which formed a heterogeneous phase with the reactants, thereby involving catalyst recovery and purification problems. Thus, in the past sulfuric acid, various Friedel-Crafts type catalysts, such as aluminum chloride, and so forth, have been employed.

It is an object of this invention to provide another process for the alkylation of aromatic compounds.

A more specific object of the invention is to provide a catalytic process for the alkylation of aromatic hydrocarbons, wherein the catalyst is in a homogeneous phase with the reactants.

Our invention comprises alkylating aromatic hydrocarbons or other aromatic compounds at elevated temperatures and pressures in the presence of a catalyst consisting essentially of an organic halide.

An important feature of our process from the practical standpoint is the fact that a very small amount of catalyst is required. In our operations, we prefer to use about 3 to 5% with respect to the total charge of aromatics and olefins. It is to be noted particularly that in contradistinction to the prior art, in which only heterogeneous catalysts of alkylation are used, the present invention employs catalysts which are gaseous under the conditions of operation, and therefore, are in one homogeneous phase with the aromatics and olefins, or the like, being processed.

The organic halide catalysts of this invention comprise organic halogen derivatives, wherein a halogen has been substituted for part or all of the hydrogen of an organic compound; the efficiency of the catalyst apparently being somewhat in proportion to the ease with which it gives up hydrogen halide during the alkylation. In general, the preferred catalysts are halogen derivatives of hydrocarbons, and, particularly, cheap chlorine derivatives, wherein the halogen is substituted onto a non-ring portion, if any, of the hydrocarbon. It is to be understood herein that by "derivatives of hydrocarbons" we mean compounds wherein all the hydrogen has been substituted, e. g., carbon tetrachloride, as well as compounds wherein only part of the hydrogen has been substituted, e. g., chloroform. We especially prefer to use as our catalysts chlorinated derivatives of light paraffinic hydrocarbon, including hydrocarbons of gasoline-boiling range. Thus, at the present time, we consider a chlorinated naphtha or a chlorinated butane as the most feasible catalyst from a practical standpoint. However, other specific catalysts that may be mentioned by way of example of the compounds that may be used are: choloroform; carbon tetrachloride; ethyl chloride; dichloro-difluoro methane; dichloro-monofluoro methane; ethyl bromide; ethylene dichloride; trichlor-acetic acid; chloral; acetyl chloride; benzoyl chloride; benzyl chloride; and so forth. It is to be understood that free halogens or hydrogen halides reacting with hydrocarbons can be used to form our catalyst in situ.

The aromatic hydrocarbons or other aromatic compounds, and the olefin hydrocarbons to be used in our process may be derived from any suitable source, as is known in the art, and may be used either in the pure state or in admixture with other constituents which are not undesirable. Since low molecular compounds will usually be desired, the aromatics in most operations will be compounds, such as, benzene, toluene, phenol, and so forth; and the olefins will be in the $C_2$ to $C_5$ range. However, it is to be understood that the invention is not limited to such specific compounds.

In carrying out our process, we prefer to use, for practical operations, temperatures between about 300 and about 800° F., and particularly prefer temperatures between about 500 and 700° F. Thus, we have noted that the alkylation in our process takes place readily only under, what might be termed, moderate temperature conditions, as compared to a strictly thermal process. The alkylated aromatic product obtained under these conditions is relatively pure, so that the predominance of alkylation obtained thereby is a distinct feature of the process. Under appreciably higher temperature conditions, side reactions occur that substantially reduce the purity of the desired product.

The minimum practical pressure will be about 100 to 200 lbs. per square inch depending somewhat upon the aromatic compound. In practice, we have usually employed pressures between about 200–300 lbs. per square inch to about 1,000 lbs. per square inch or more and found them quite satisfactory. The most suitable pressure is more or less dependent upon the particular temperature involved. In general, the higher the pressure, the higher the yield of alkylate. Accordingly, the upper limit of pressure is set primarily by the feasibility of maintaining such pressure.

In our process, it is desirable, as in other alkylation processes to maintain the concentration of olefins relatively low with respect to the aromatic concentration during reaction in order to eliminate as much olefin polymerization as possible.

During the reaction the chlorinated compound serving as a catalyst partially decomposes with the formation of hydrogen chloride. Therefore, when the product is to be put to uses where the presence of small amounts of hydrogen chloride or free chlorine is undesirable, suitable refining treatments should be carried out in order to reduce this chlorine content of the product to a permissible level.

The following examples are given in order to illustrate the invention further:

Example I 248 parts by weight of benzene, 74 parts by weight of amylene, and 16 parts by weight of chloroform, were processed in an autoclave, at 700° F. for one hour. Thereafter, the reaction mixture was distilled, yielding 45 parts by weight of alkylated benzene.

Example II

The experiment of Example I was repeated under the same conditions, but in the absence of chloroform. In this experiment, only 5 parts by weight of a reaction product were obtained and it comprised primarily amylene polymers.

Example III 248 parts by weight of benzene, 74 parts by weight of amylene, and 16 parts by weight of ethyl bromide were processed in an autoclave at 600° F. for one hour. Under these conditions, 43 parts by weight of alkylated benzene were produced.

Example IV 226 parts by weight of phenol, 56 parts by weight of amylene, and 14 parts by weight of chloroform were processed at 500° F. in an autoclave for one hour. Upon fractionation of the reaction mixture, 122 parts of alkylated phenol were obtained.

We claim:

1. The process of alkylating an aromatic hydrocarbon which comprises contacting the aromatic hydrocarbon and an olefin at a temperature of about 300° to about 800° F. in the presence of a small amount of a catalyst consisting essentially of a chlorine derivative of a light paraffinic hydrocarbon.

2. The process of alkylating an aromatic hydrocarbon which comprises contacting the aromatic hydrocarbon and an olefin at a temperature between about 500 and about 700° F. and at a pressure above about 200 pounds per square inch in the presence of a small amount of a catalyst consisting essentially of a chlorine derivative of a light paraffinic hydrocarbon.

3. The process which comprises reacting benzene and amylene in the presence of a catalyst consisting essentially of chloroform at about 700° F.

4. The process which comprises reacting benzene and amylene in the presence of a catalyst consisting essentially of ethyl bromide at a temperature of about 600° F.

5. The process of alkylating an aromatic hydrocarbon which comprises contacting the aromatic hydrocarbon and an olefin at a temperature of about 300° to about 800° F. in the presence of a small amount of a catalyst consisting essentially of an organic halide.

6. The process of alkylating an aromatic hydrocarbon which comprises contacting the aromatic hydrocarbon and an olefin at a temperature of about 300° to about 800° F. and a pressure not substantially below 100 lbs. per square inch in the presence of a small amount of a catalyst consisting essentially of an organic halide.

7. The process of alkylating an aromatic hydrocarbon which comprises contacting the aromatic hydrocarbon and an olefin at a temperature of about 500° to about 700° F. in the presence of a small amount of a catalyst consisting essentially of an organic halide.

8. The process of alkylating an aromatic hydrocarbon which comprises contacting the aromatic hydrocarbon and an olefin at a temperature of about 500° to about 700° F. and a pressure not substantially below 200 lbs. per square inch in the presence of a small amount of a catalyst consisting essentially of an organic halide.

9. The process of alkylating an aromatic hydrocarbon which comprises contacting the aromatic hydrocarbon and an olefin at a temperature of about 300° to about 800° F. in the presence of a small amount of a catalyst consisting essentially of an organic chloride.

10. The process of alkylating an aromatic hydrocarbon which comprises contacting the aromatic hydrocarbon and an olefin at a temperature of about 300° to about 800° F. and a pressure not substantially below 100 lbs. per square inch in the presence of a small amount of a catalyst consisting essentially of an organic chloride.

11. The process of alkylating an aromatic hydrocarbon which comprises contacting the aromatic hydrocarbon and an olefin at a temperature of about 500° to about 700° F. in the presence of a small amount of a catalyst consisting essentially of an organic chloride.

12. The process of alkylating an aromatic hydrocarbon which comprises contacting the aromatic hydrocarbon and an olefin at a temperature of about 500° to about 700° F. and a pressure not substantially below 200 lbs. per square inch in the presence of a small amount of a catalyst consisting essentially of an organic chloride.

ALEXANDER N. SACHANEN.
SELBY B. DAVIS.